(12) United States Patent
Chen

(10) Patent No.: US 8,095,183 B2
(45) Date of Patent: Jan. 10, 2012

(54) PORTABLE ELECTRONIC DEVICE WITH DETACHABLE KEYPAD MODULE

(75) Inventor: Kuan-Hung Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 661 days.

(21) Appl. No.: 12/343,088

(22) Filed: Dec. 23, 2008

(65) Prior Publication Data

US 2010/0035649 A1 Feb. 11, 2010

(30) Foreign Application Priority Data

Aug. 7, 2008 (CN) .......................... 2008 1 0303579

(51) Int. Cl.
*H04B 1/38* (2006.01)

(52) U.S. Cl. ....................... 455/557; 455/575.1; 345/169

(58) Field of Classification Search .................. 455/557, 455/575.1; 345/169
See application file for complete search history.

(56) References Cited

U.S. PATENT DOCUMENTS

| | | | |
|---|---|---|---|
| 6,909,906 B1 * | 6/2005 | Miyashita ................. | 455/550.1 |
| 7,069,057 B2 * | 6/2006 | Ishibashi et al. ............. | 455/566 |
| 7,173,606 B2 * | 2/2007 | Honkala et al. .............. | 345/169 |
| 7,565,182 B2 * | 7/2009 | Kim .......................... | 455/575.1 |
| 2002/0085338 A1 * | 7/2002 | Lin ............................. | 361/680 |
| 2003/0211834 A1 * | 11/2003 | Wu et al. ..................... | 455/90.3 |

FOREIGN PATENT DOCUMENTS

TW I264927 B 10/2006

* cited by examiner

*Primary Examiner* — Khai M Nguyen
(74) *Attorney, Agent, or Firm* — Altis Law Group, Inc.

(57) ABSTRACT

A portable electronic device includes a first housing, a latching mechanism, and a keypad module. The keypad module can be removed from the electronic device without having to take apart the electronic device.

11 Claims, 5 Drawing Sheets

PORTABLE ELECTRONIC DEVICE WITH DETACHABLE KEYPAD MODULE

BACKGROUND

1. Technical Field

The exemplary embodiment relates to portable electronic devices and, particularly to a portable electronic device having a detachable keypad module.

2. Description of Related Art

Typically, a portable electronic device includes a first housing, a second housing, and a keypad module. The first housing securely attaches to the second housing to define an enclosing space to accommodate electronic components of the portable electronic device. The keypad module is latched inside the enclosing space.

However, to replace the keypad module, the housings of the portable electronic device have to be detached/separated. Thus, it is inconvenient and time consuming.

Therefore, there is room for improvement within the art.

BRIEF DESCRIPTION OF THE DRAWINGS

Many aspects of the exemplary portable electronic device using the housing can be better understood with reference to the following drawings. These drawings are not necessarily drawn to scale, the emphasis instead being placed upon clearly illustrating the principles of the exemplary housing. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
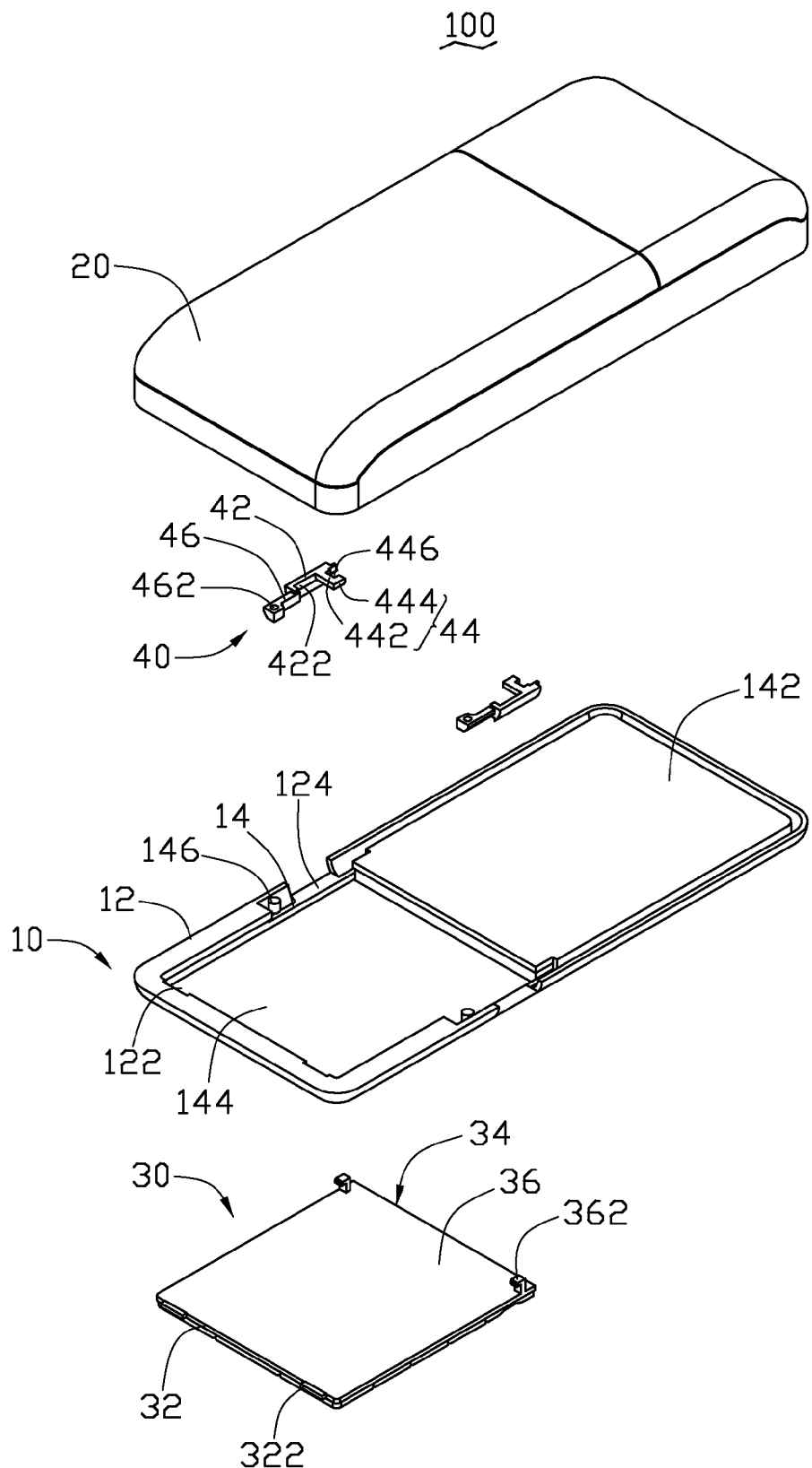
FIG. 1 is a schematic and exploded view of a portable electronic device according to an exemplary embodiment, showing one aspect.
Figure 5:
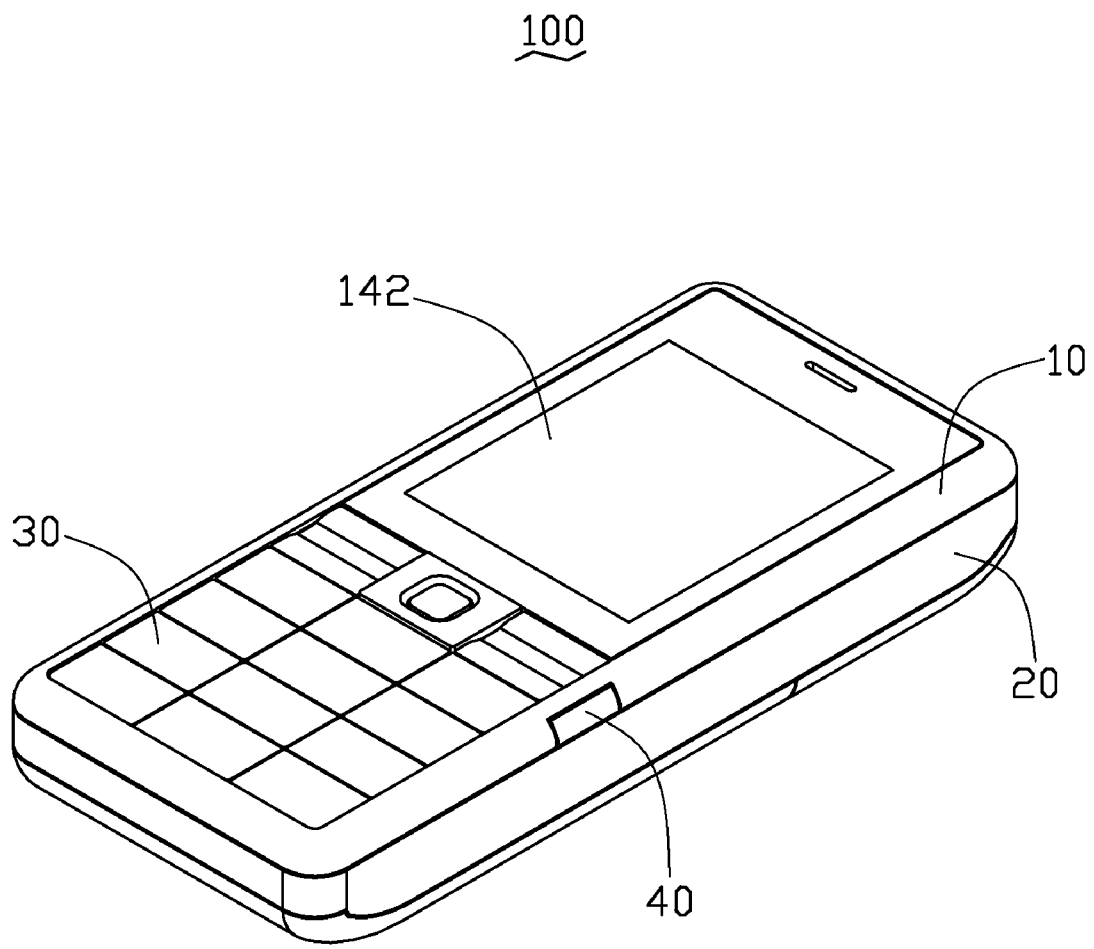
FIG. 5 is a schematic and assembled view of the portable electronic device in FIG. 2.

FIGS. 1 and 5 show a portable electronic device 100, such as a mobile phone, including a first housing 10, a second housing 20 secured with the first housing 10, a keypad module 30, and two latching mechanisms 40. The keypad module 30 can be detachably assembled to the first housing 10 by the latching mechanisms 40. The latching mechanisms 40 can be rotatably secured to the first housing 10.

The keypad module 30 is generally rectangular and includes a first end 32, an opposite second end 34, and a first surface 36 facing the second housing 20. The keypad module 30 has two blocks 322 protruding from the first end 32. The blocks 322 are used to latch to the first housing 10. The keypad module 30 further has two hooks 362 protruding from the first surface 36 adjacent to the second end 34. The hooks 362 are used to latch to the latching mechanism 40.

Each latching mechanism 40 includes a main body 42, a securing portion 44 adjacent to one end of the main body 42, and a fixing portion 46 adjacent to another end of the main body 42. The securing portion 44 and the fixing portion 46 extend from the same side surface of the main body 42. The securing portion 44 is substantially L-shaped, and includes a connecting portion 442 and a resisting portion 444 distal to the main body 42. The connecting portion 442 connects the resisting portion 444 to the main body 42, and thus defines a notch 446 therebetween. The notch 446 is configured for releasing the hook 362 from the corresponding resisting portion 444. The fixing portion 46 extends away from the securing portion 44. The fixing portion 46 defines an aperture 462 for securely engaging the latching mechanism 40 with the first housing 10. The latching mechanism 40 should be elastic, so the main body 42 can be deformed to drive the securing portion 44 to move relative to the first housing 10 when pressing the main body 42 and then return to its non-deformed position.

Figure 2:
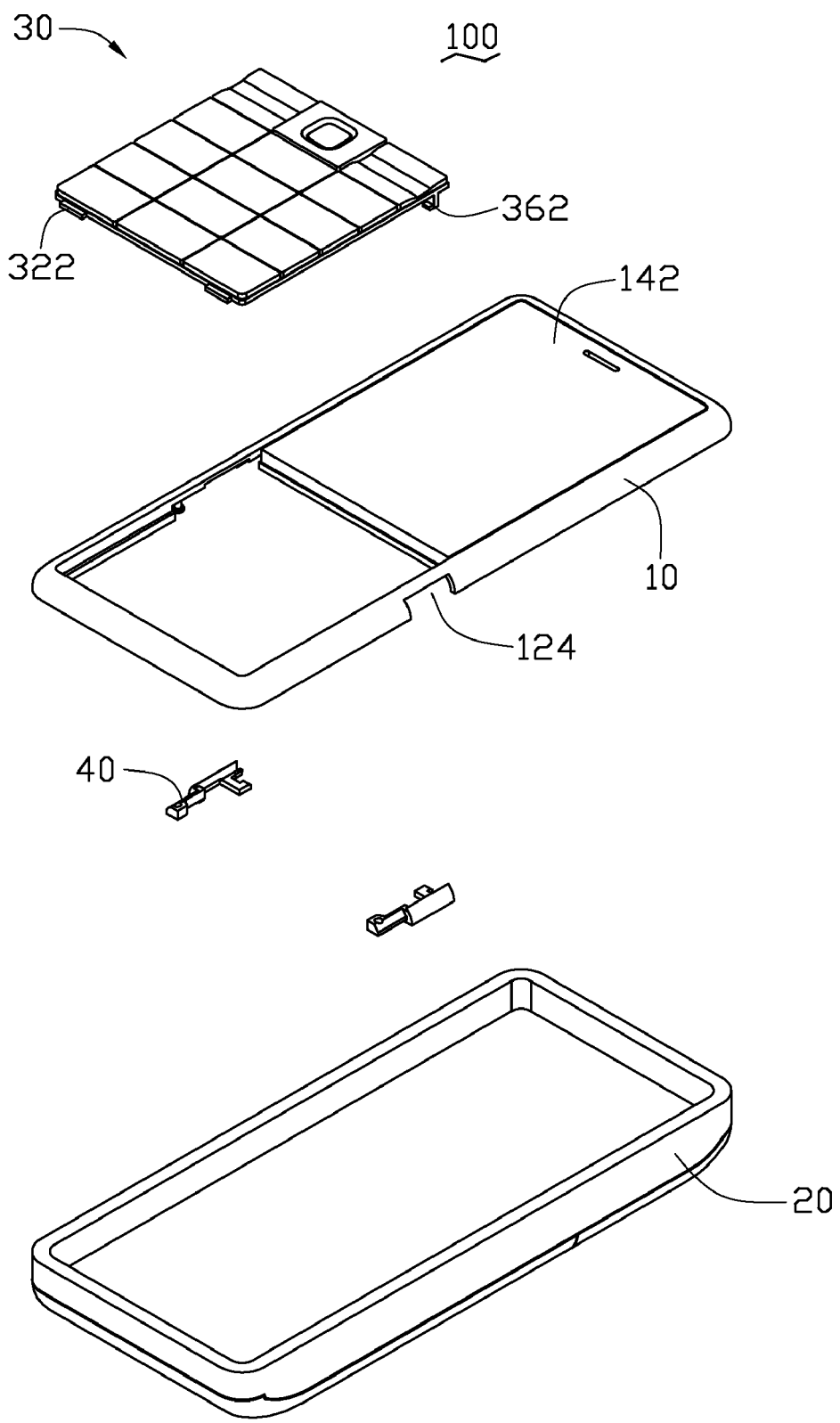
FIG. 2 is another schematic and exploded view of the portable electronic device in FIG. 1.

Referring to FIGS. 1 and 2, the first housing 10 includes a peripheral wall 12 and a bottom wall 14 connecting the peripheral wall 12. The bottom wall 14 can have a display 142 arranged in one end, and a through opening 144 corresponding to the keypad module 30 defined in the other end. The peripheral wall 12 defines two slots 122 facing the through opening 144 and corresponding to the blocks 322. The slots 122 are used to receive the blocks 322 therein (seen in FIG. 3). The peripheral wall 12 further defines two opposite openings 124. The openings 124 are configured for accommodating part of the main body 42. The first housing 10 has two poles 146 corresponding to the apertures 462 protruding upwardly from the bottom wall 14.

Figure 3:
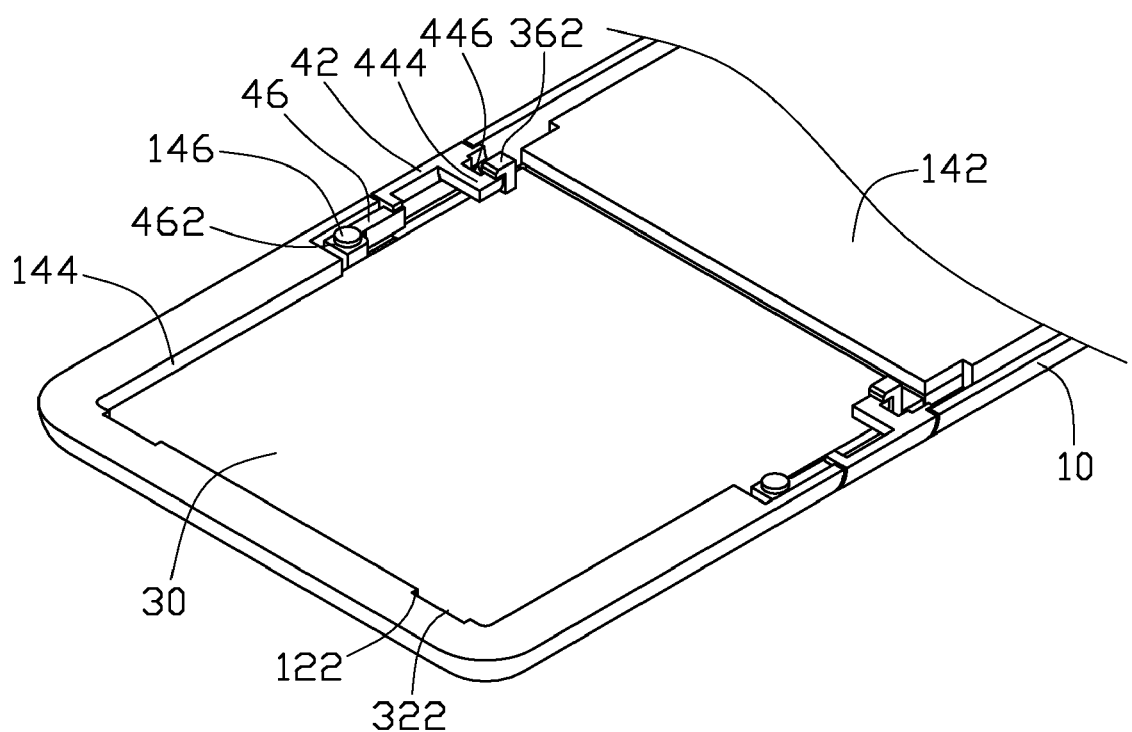
FIG. 3 is a schematic and assembled view of the first housing of a portable electronic device in FIG. 1.
Figure 4:
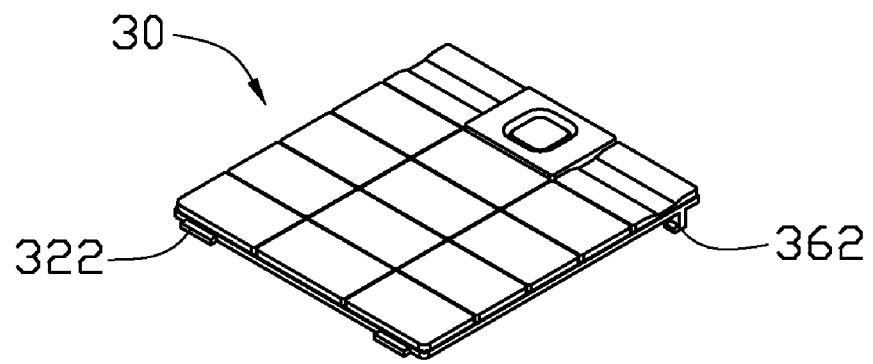
FIG. 4 is a schematic and assembled view of the portable electronic device in FIG. 2, with the keypad module removed.
Figure 4:
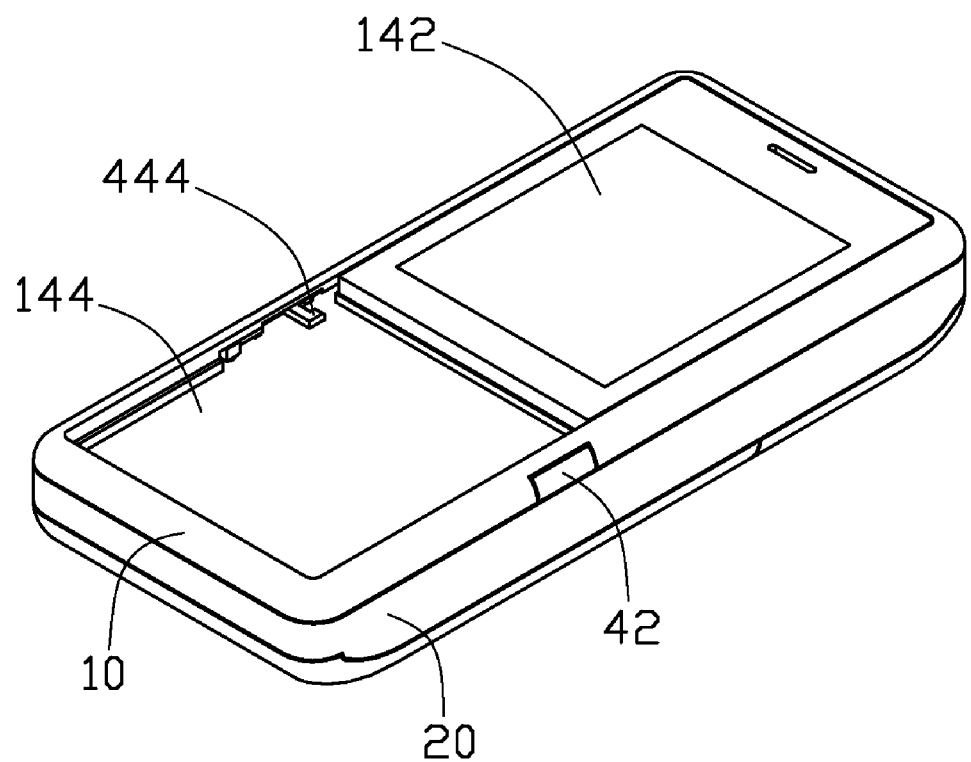

Referring to FIGS. 3 through 5, during assembly, the latching mechanism 40 is securely attached to the first housing 10. At this time, the poles 146 are received and securely positioned (e.g., hot-melted) in the apertures 462. The main bodies 42 are partially accommodated in the openings 124. The first housing 10 is securely adhered to the second housing 20. The keypad module 30 is aligned with the through opening 144 of the first housing 10 and the blocks 322 latched into the slots 122. The keypad module 30 is pressed toward the first housing 10 until the resisting portion 444 of the securing portion 44 latches with the hooks 362.

Referring to FIG. 3, to remove the keypad module 30 from the portable electronic device 100, the main body 42 is pressed inward to bias the securing portion 44 until the notches 446 align with the hooks 362. The hook 362 is released from the securing portion 44, therefore, the keypad module 30 may easily be removed from the portable electronic device 100.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a first housing having an opening and a slot perpendicular to the opening;
   a latching mechanism being secured on the first housing and being partially exposed from the first housing through the opening; and
   a keypad module including a block and a hook, the block being latched with the slot, and the hook releasably latched with the latching mechanism.

2. The portable electronic device as claimed in claim 1, wherein the keypad module includes a first end, and an opposite second end, the block protrudes outwardly from the first end, the hook protrudes adjacent to the second end.

3. The portable electronic device as claimed in claim 1, wherein the latching mechanism includes a main body, a securing portion extending from a side wall of the main body and located adjacent to one end of the main body, and a notch is defined between the sidewall of the main body and the securing portion.

4. The portable electronic device as claimed in claim 3, wherein the securing portion includes a connecting portion extending from the sidewall of the main body and a resisting portion extending from a distal end of the connecting portion, the notch defined between the sidewall of the main body and the resisting portion.

5. The portable electronic device as claimed in claim 4, wherein the notch is configured for releasing the hook from the resisting portion.

6. The portable electronic device as claimed in claim 4, wherein the resisting portion is configured for latching with the hook.

7. The portable electronic device as claimed in claim 4, wherein the first housing includes a peripheral wall and a bottom wall connecting with peripheral wall, a hole is defined in the bottom wall for accommodating the keypad module.

8. The portable electronic device as claimed in claim 7, wherein the slot is defined in an inner wall of the peripheral wall.

9. The portable electronic device as claimed in claim 7, wherein the opening is defined in the peripheral wall.

10. The portable electronic device as claimed in claim 1, wherein the latching mechanism further includes a fixing portion protruding from the sidewall and away from the securing portion, the fixing portion attaching the securing mechanism to the first housing.

11. The portable electronic device as claimed in claim 10, wherein the fixing portion has an aperture defined therein, the first housing has a pole corresponding to the aperture, and the pole is received in the aperture.

\* \* \* \* \*